Figure 1:
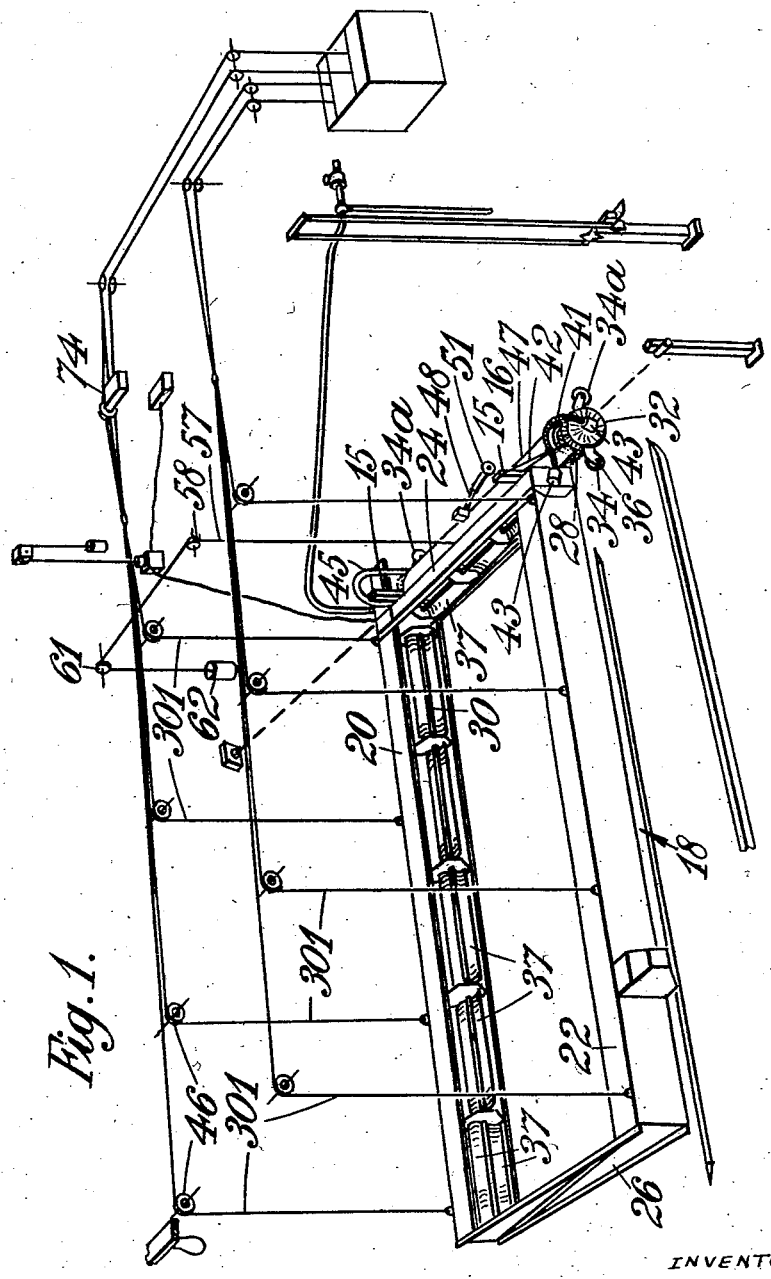

Aug. 20, 1957 W. J. MORISON 2,803,025
APPARATUS FOR CLEANING VEHICLES
Filed April 5, 1954 6 Sheets-Sheet 1

INVENTOR
William J. Morison
By Watson, Cole, Grindle &
Watson
ATTORNEYS

Aug. 20, 1957   W. J. MORISON   2,803,025
APPARATUS FOR CLEANING VEHICLES
Filed April 5, 1954   6 Sheets-Sheet 3

INVENTOR
William J. Morison
By Watson, Cole, Grindle &
Watson ATTORNEYS

Aug. 20, 1957  W. J. MORISON  2,803,025
APPARATUS FOR CLEANING VEHICLES
Filed April 5, 1954  6 Sheets-Sheet 5

INVENTOR
William J. Morison
By Watson, Cole, Grindle & Watson
ATTORNEYS

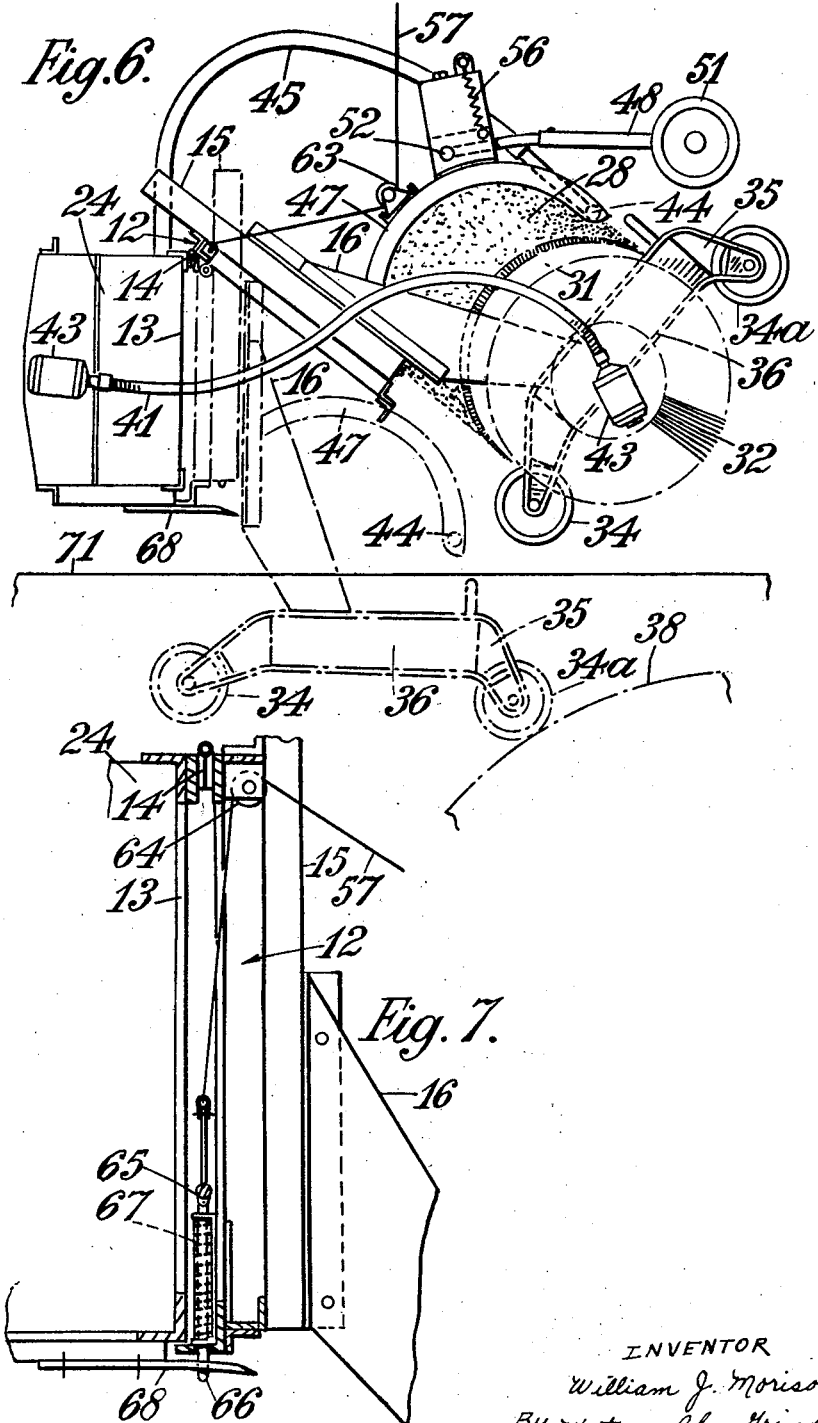

United States Patent Office 2,803,025
Patented Aug. 20, 1957

2,803,025

APPARATUS FOR CLEANING VEHICLES

William John Morison, Chelmsford, England

Application April 5, 1954, Serial No. 421,082

Claims priority, application Great Britain
August 5, 1953

9 Claims. (Cl. 15—21)

The invention relates to apparatus for mechanically cleaning vehicles, e. g. omnibuses, commercial vehicles, motor cars and the like.

The invention is more particularly, but not exclusively, concerned with apparatus for mechanically cleaning vehicles and of the kind (hereinafter referred to as the kind described) comprising in combination a carrier, wiper devices carried thereby, mechanism for imparting a cleaning, preferably rotary, motion to the wiper devices, which carrier is capable of vertical movement while the wiper devices are in motion and in wiping contact with the outside of the vehicle, and means for effecting vertical movements of the carrier as aforesaid.

The present invention comprises an improvement in or modification of the invention described and claimed in United States Patent No. 2,583,703, dated January 29, 1952, which describes apparatus for mechanically cleaning a vehicle and of the kind described, in which apparatus the carrier is suspended from a superstructure lying above the level of the top of the vehicle by suspension means which are operable to effect vertical movements of the carrier as aforesaid, and in which the carrier comprises two horizontally spaced limbs, between which the vehicle may be received for cleaning, each of which limbs carries at least one of the wiper devices, and the carrier also comprises at least one tie member connecting the two spaced limbs and extending between them at or near one pair of corresponding ends of the two spaced limbs, which tie member serves to maintain the wiper devices, on the two spaced limbs, in wiping contact with the vehicle.

It is an object of the present invention to provide improved apparatus for mechanically cleaning the roofs of vehicles.

The invention provides, in one of its aspects, apparatus for mechanically cleaning a vehicle and as claimed in any one of the claims of United States Patent No. 2,583,703 in which the carrier carries one or more additional wiper devices arranged so that when the carrier is positioned at a level just higher than the level of the top of a vehicle having a roof, the vehicle may be driven beneath the said additional wiper device or devices with it or them in wiping contact with the roof of the vehicle, so that the additional wiper device or devices clean the roof of the vehicle.

The additional wiper device or devices, which will normally extend lower than the underside of the carrier, is or are preferably mounted for retracting upward movement relative to the carrier to prevent engagement of them with the floor when the carrier is lowered to clean the lower parts of the sides of the vehicle. The wiper device or devices may be carried by a sub-carrier which may be pivoted to the carrier to provide such retracting upward movement by movement about its pivotal axis.

A plurality of additional wiper devices are preferably provided and it is preferred that they are rotary wiper devices carried by a rotatable shaft extending, for example, transversely of the carrier. The shaft may have one or more universal joints intermediate in its length and between the wiper devices whereby the direction of part of the shaft relative to another part thereof may be changed. The shaft is preferably mounted so as to permit movement at its universal joint or joints under the action of a vehicle-roof being cleaned, so that the relative directions of the parts of the shaft are appropriate to the shape of the roof being cleaned.

The invention provides, in another of its aspects, apparatus for cleaning an exterior surface of a vehicle comprising rotary wiper devices carried by a rotatable shaft so that the surface to be cleaned may be traversed past the wiper device or devices with the wiper device or devices in wiping contact with the surface, and means for rotating the shaft, which shaft has one or more universal joints intermediate in its length and between the wiper devices whereby the direction of part of the shaft relative to another part thereof may be changed to permit the wiper devices to clean an increased area of a surface of curved or other non-flat shape.

Figure 2:
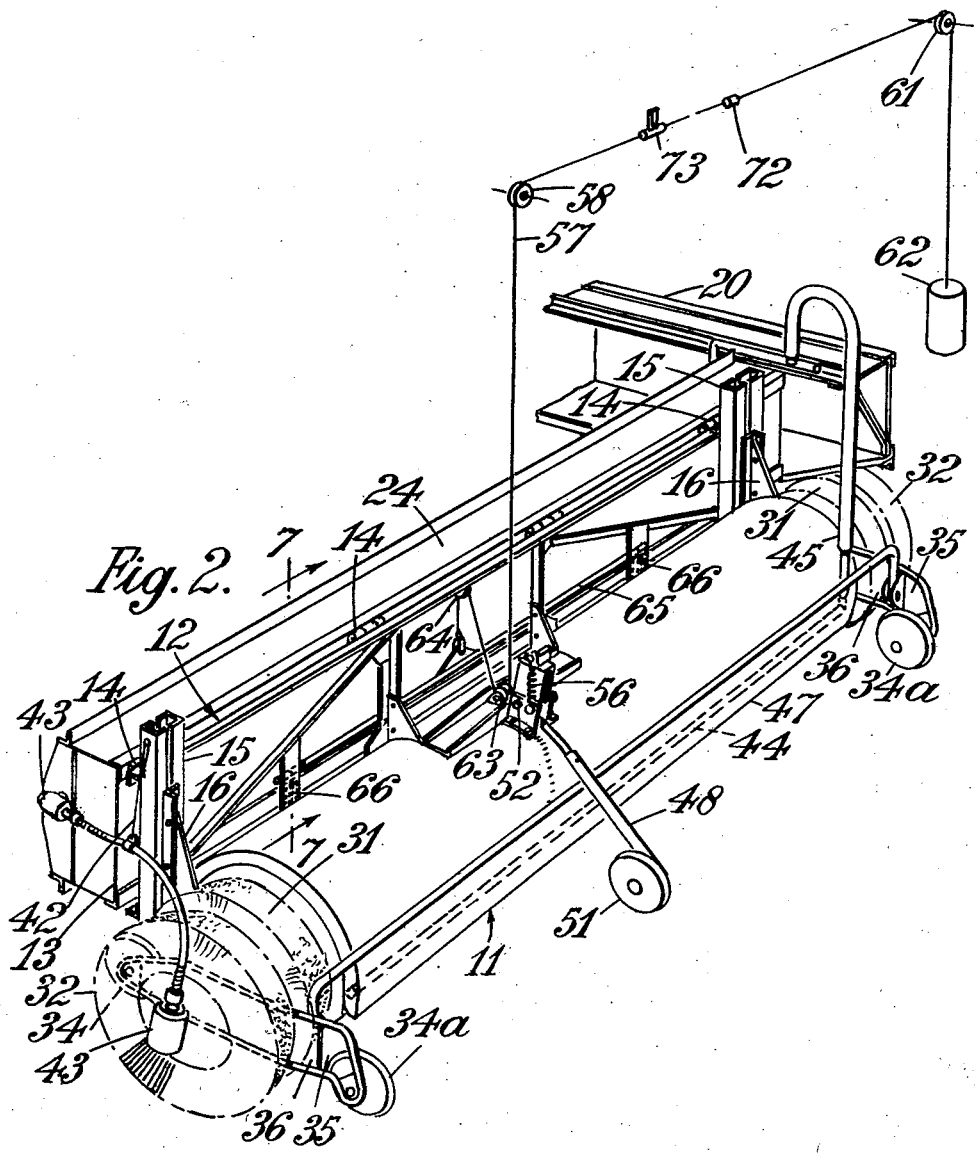
Figure 3:
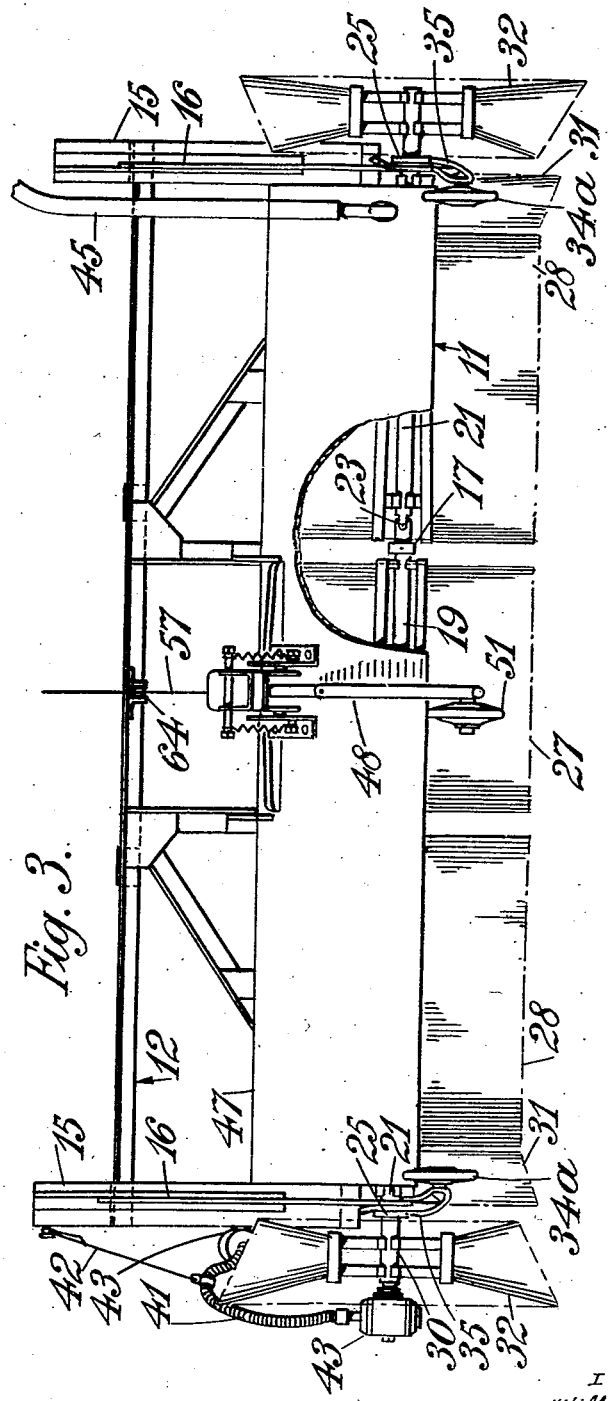
Figure 4:
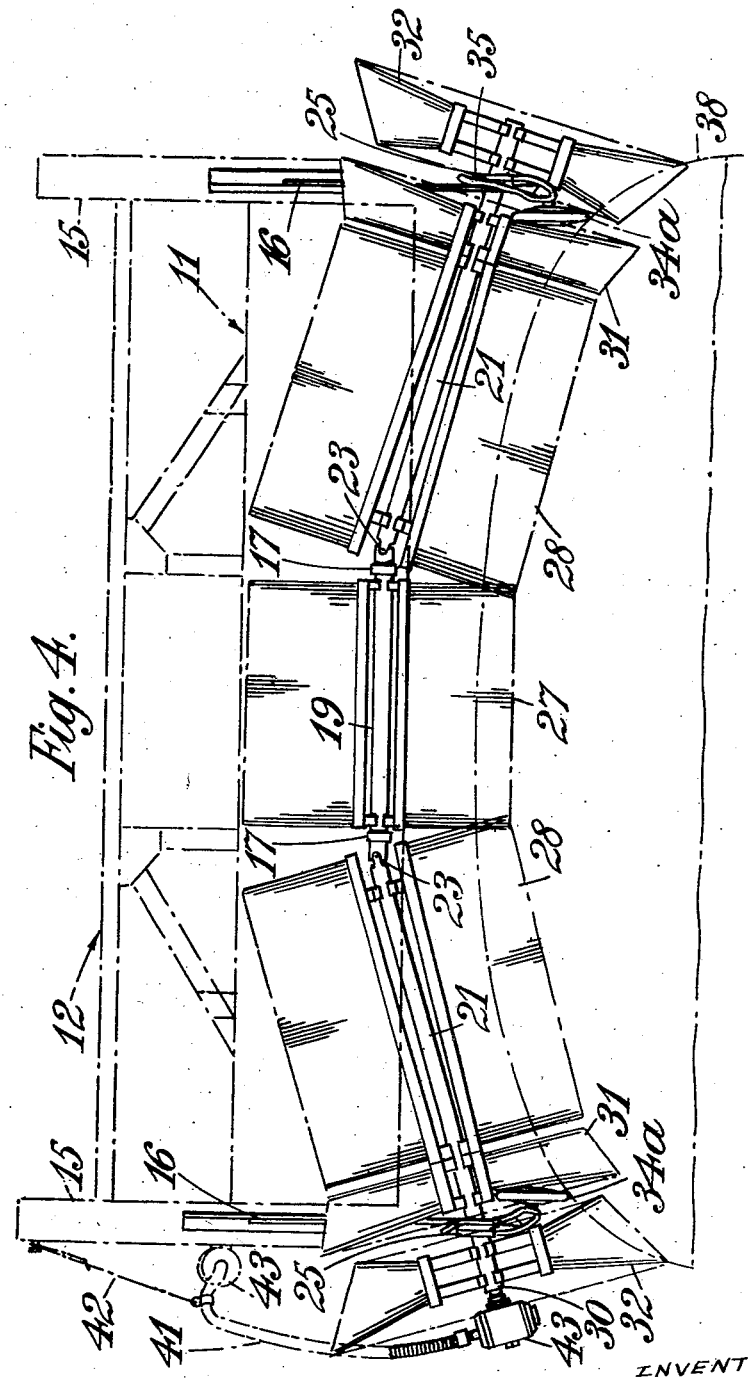
Figure 5:
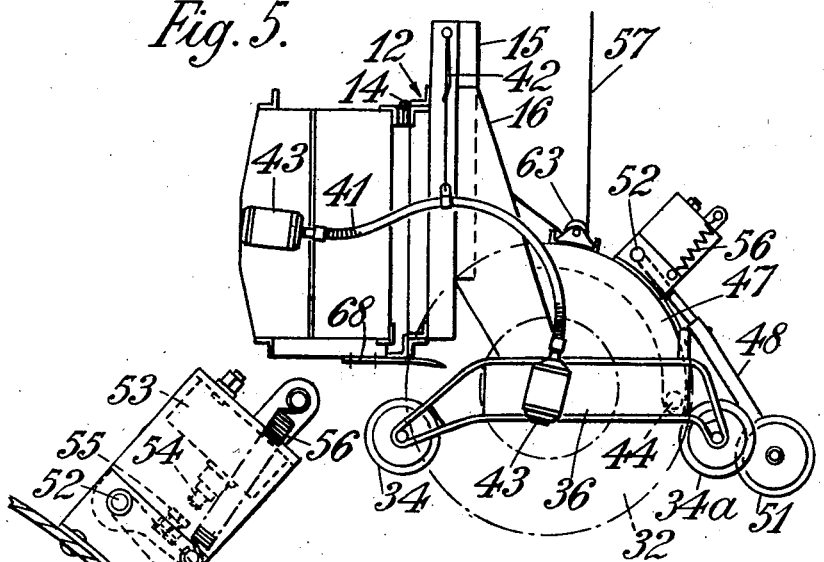
Figure 8:
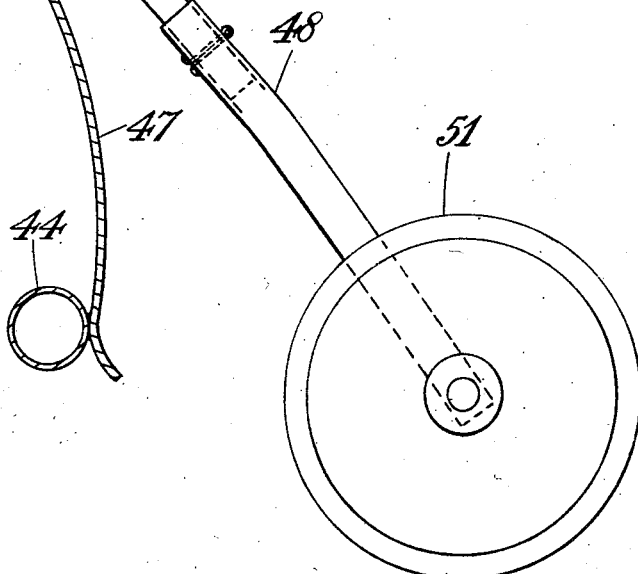

The foregoing, and other, features of the invention are embodied in a specific construction of a vehicle cleaning apparatus which will now be described by way of example, and with reference to the accompanying drawings in which:

Figure 1 is a perspective view of the apparatus,

Figure 2 is a perspective view of the rear end of the carrier showing the sub-carrier and associated parts of the roof-cleaning section of the apparatus, Figure 3 is a rear elevation of the carrier showing the sub-carrier and its associated parts, the roof-cleaning brushes being shown in their horizontal position, Figure 4 is a rear elevation corresponding to Figure 3 but showing the outer roof-cleaning brushes inclined to the maximum extent, Figure 5 is an end view of the sub-carrier and associated parts of the roof-cleaning section of the apparatus, Figure 6 is a more diagrammatic end view corresponding to Figure 5 but showing the sub-carrier in its raised position about its hinge pivots, its lowered position being indicated in chain lines, Figure 7 is a part sectional view on the line 7—7 in Figure 2 showing the hinges and the latch bolt and striker plate arrangement, and Figure 8 is a side view of the feeler arm and its associated parts.

In this example the apparatus is a modification of the apparatus described and illustrated in United States Patent No. 2,583,703.

The apparatus comprises a carrier, having two side limbs 20, 22 a rear limb 24 and a front limb 26, and suspended by cables 301 passing over pulleys 46 mounted on a garage roof or other superstructure. A motor 74 is provided for operating the cables 301 to raise and lower the carrier 18. The limbs 20, 22, 24 of the carrier are provided with electrically driven rotary wiper devices, comprising flat brushes 37 extending in diametrical planes from shaft 30, for cleaning the sides and back of a vehicle.

At the rear vertical face of the rear limb 24 there is provided a sub-carrier 11 carrying the additional wiper devices. The sub-carrier 11 comprises a cross-braced rectangular framework 12 normally lying close to the rear vertical face 13 of the limb 24 and pivoted at its upper edge to the upper edge of that limb by hinges 14 at four spaced positions along its length. At each end the framework 12 carries two vertical channelled posts 15 carrying respectively two rearwardly and downwardly extending brackets 16 which are slidable upwards and downwards along the length of the posts 15 without any rotational movement relative to them. The posts 15 extend a short distance above the frame work 12 to increase the permissible vertical travel of the brackets 16.

Two straight bearing arms 17 extend horizontally rearwardly at horizontally spaced positions from the lower edge of the frame-work 12 and carry at their free ends the horizontal centre part 18 of a rotatable three-part shaft, the centre part 18 of which has a length equal to about one quarter of that of the framework 12 and is centrally positioned with respect to the length of the framework 12. The two outer parts 21 of the shaft are connected by universal joints 23 to the ends of the centre part 18, and the outer ends of the outer part 21 pass through swivelling bearing 25 carried by the outer ends of the vertically slidable brackets 16. When the brackets 16 are at their uppermost positions (as shown in Figure 3) the other parts 21 of the shaft are horizontal, and as the brackets 16 slide downwards to their lowermost positions the outer parts 21 of the shaft become inclined downwards, moving in a common vertical plane, to extreme positions in which they slope downwardly at about 15° to the horizontal (as shown in Figures 2 and 4). The centre part 18 of the shaft carries for rotation a cylindrical rotary brush 27. Two slightly longer cylindrical rotary brushes 28 are carried for rotation by the outer parts 21 of the shaft. Axially beyond its cylindrical brush 28 each outer part 21 of the shaft carries for rotation two frusto-conical rotary brushes 31, 32 having their larger diameters outermost and with the frusto-conical brushes 32 situated axially beyond the slidable brackets 16. The lower outline of the brushes is thus adjustable, by raising or lowering the outer parts 21 of the shafts about their universal joints 23, to provide a wiping action along a line extending across the whole width of the roof (e. g. as indicated at 38 in Figure 4) of any conventional omnibus the frusto-conical brushes 31, 32 acting upon the sharp downward curves where the top of the roof meets the sides of the vehicle.

Each of the slidable brackets 16 carries at its lower end a pair of wheels 34, 34a mounted on stud axles on a tubular member 35 having a supporting plate 36. The rearmost wheel 34a of each pair is slightly lower (by about 2 inches) than the foremost one (when the sub-carrier 11 is lowered as for example in Figure 2) and they are positioned so that if an omnibus is driven towards the carrier from behind it, when the carrier is at the appropriate height, the rounded front end of the roof (indicated in chain lines at 38 in Figure 6) of the omnibus engages beneath the rear pair of wheels 34a and lifts them, together with the slidable brackets 16 and the outer brushes 28, 31, 32 to a height which is such that the brushes are in proper wiping engagement with the roof.

The shaft 18, 21 is driven by means of a flexible drive 41 coupling it to the shaft 30 of the wiper devices 37 in the limb 24. The flexible coupling 41 has a check cable 42 and has gear boxes 43 at its ends to turn the direction of drive through 90° at each end to minimize the angles through which the flexible drive 41 has to bend.

As the omnibus is driven forward under the rotating brushes 27, 28, 31, 32 its roof is traversed past them so that all parts of it are submitted in turn to their action. A perforated pipe 44 (see Figure 5) is provided, and has a supply pipe 45, to spray water or a detergent solution on to the part of the roof which is just about to pass beneath the brushes. When the rear end of the roof has passed under the brushes the outer brushes 28, 31, 32 in general drop slightly until the leading pair of wheels 34 engage with the roof, and as they run off of the downwardly curved rear end of the roof they allow the slidable brackets 16 to drop to their lowermost positions. A braced metal deflector 47 of inverted channel shape extends along the length of the brushes so as to form a screen over their top and so prevent water from being thrown about by them. The rear edge of the deflector 47 carries the spray pipe 44.

The deflector 47 carries at the centre of its rear edge a rearwardly and downwardly projecting pivoted feeler arm 48 carrying at its free end a light rubber-tired wheel 51, for engagement with the roof of an omnibus when it is stationary just behind the carrier and positioned ready for its roof to be washed. The arm is pivoted about a horizontal axis at 52 for movement upwards from the position in which it is shown in Figure 8. A micro-switch 53 is mounted for pivotal movement, about the axis 52, in the same direction as the feeler arm 48 and has its plunger 54 downwardly and forwardly directed for engagement by a projection 55 on the feeler arm. The micro-switch is urged about its pivot towards the feeler arm by two light springs 56 secured at their lower ends to the deflector. When the carrier is lowered the light rubber-tired wheel 51 on the free end of the feeler arm comes into engagement with the front end of the roof of the omnibus and the feeler arm is thus moved upwardly to operate the plunger 54 of the micro-switch 53. The switch 53 is connected so that on such operation it causes the downward movement of the carrier to stop, and the carrier is thus stopped at a height suitable for the omnibus roof to be cleaned by driving the vehicle forward as aforesaid.

After the roof has been washed the carrier is caused to descend over the vehicle in the normal manner to clean the sides and back of it. In order that the carrier may approach sufficiently near to the floor to clean the lower parts of the sides and back of the vehicle it is necessary for the sub-carrier 11 to be pivoted upwards about its hinges 14 before the carrier reaches its lowermost position. This is achieved by means of a lifting cable 57 which passes over a supporting pulley 58 provided on the roof structure of the garage, or other suitable support, above the centre of the deflector 57, and over another pulley 61 a convenient distance away. From the pulley 61 the cable descends to carry a counterweight 62. The cable 57 passes downwardly to a pulley 63 attached to the centre of the top of the deflector, thence forwardly and upwardly to a pulley 64 at the top of the framework 12 and thence downwardly to a horizontal latch coupling bar 65 which connects two latch bolts 66 which normally secure the sub-carrier 11 against pivoting movement. The latch bolts 66 are carried by the framework 12, near the bottom thereof, and are urged downwardly by springs 67 into latching engagement with two apertured striker plates 68 projecting from the lower edge of the limb 24. Springs 67 prevent the latch bolts 66 being released by the weight of the counterweight 62, the function of which is merely to prevent sag in the cable 57. When the carrier nears the bottom of its travel a stop 72 clamped to the cable 57 meets a member 73 connected to the roof structure thus causing the cable 57 to be tensioned under the weight of the carrier. The tightening of the cable overcomes the action of the springs 67 and releases the latches 66. The cable then lifts the sub-carrier 11 abouts its hinges 14, as the carrier descends lower, so that the lowest part of the sub-carrier 11 is clear of the floor 71 (see Figure 6) when the carrier is at the bottom of its necessary travel. As the carrier is subsequently raised again the sub-carrier 11 rotates back to its original position, under its own weight, and the striker plates 68 eventually re-engage with the latch bolt 66.

The invention is not restricted to the details of the foregoing example. For instance any other convenient form of wiper means may be employed on the sub-carrier instead of brushes. The roof washing unit may be incorporated in the apparatus as built or it may be added to existing apparatus as described and illustrated in U. S. Patent No. 2,583,703 or in pending U. S. patent application Serial No. 379,034.

I claim:

1. Apparatus for mechanically cleaning a vehicle, comprising in combination a carrier having horizontally spaced limbs, for reception between them of a vehicle having a roof, cleaning means carried by said limbs for cleaning the sides of the vehicle, elevator means for moving the carrier vertically, whereby the carrier may be moved vertically to receive a vehicle between the said limbs as aforesaid, at least one downwardly directed wiper device carried by the carrier, whereby the vehicle may be driven beneath the said wiper device with it in wiping contact with the roof of the vehicle so that the said wiper device cleans the roof of the vehicle, the said wiper device extending lower than the underside of the carrier and being mounted for retracting upward movement relative to the carrier, and means for effecting retracting upward movement of the said wiper device when the carrier is lowered to clean the lower parts of the sides of the vehicle.

2. Apparatus according to claim 1, including a sub-carrier by which the said wiper device is carried, the said sub-carrier being pivoted to the carrier for pivotal movement thereby to permit the aforesaid upward retracting movement.

3. Apparatus according to claim 2, wherein the said means for effecting the retracting upward movement comprise at least one lifting cable attached to said sub-carrier at a position spaced from its pivot and extending upwardly from the sub-carrier, and means for limiting downward movement of said cable, whereby as the carrier is lowered the sub-carrier is lifted about its pivot by the lifting cable and as the carrier is subsequently raised the sub-carrier is lowered about its pivot.

4. Apparatus according to claim 3, including locking means for preventing upward retracting movement of the sub-carrier under the action of wiping engagement between said wiper device and the vehicle roof, means for rendering said locking means inoperative prior to the said lifting of the sub-carrier by the lifting cable, and means for rendering said locking means operative again when the sub-carrier has been lowered about its pivot.

5. Apparatus according to claim 1, wherein said wiper device comprises a rotary brush and means for rotating said brush.

6. Apparatus according to claim 5, wherein a plurality of said rotary brushes are provided.

7. Apparatus according to claim 1 wherein said wiper devices are carried by a rotatable shaft having at least one universal joint intermediate in its length and between said wiper devices, whereby the direction of part of said shaft relative to another part thereof may be changed while the shaft is rotating, and including means for rotating said shaft.

8. Apparatus according to claim 7 including mounting means carrying said shaft and for permitting relative movement between the said parts of the shaft at its universal joint under the action of a vehicle roof being cleaned, so that the relative directions of the said parts of the shaft are appropriate to the shape of the vehicle roof being cleaned.

9. Apparatus for mechanically cleaning a vehicle, comprising in combination, a superstructure, a carrier, suspension means by which the carrier is suspended from the superstructure and which are operable to effect vertical movement of the carrier, which carrier comprises a frame having two substantially horizontally extending side limbs, lying side by side and spaced apart horizontally along their entire length for the reception of the vehicle between them, and an end limb extending between the side limbs at one pair of corresponding ends thereof, at least three wiper devices mounted respectively on the said limbs for wiping movements relative to the limbs and allocated to three sides of the vehicle respectively, means for imparting wiping movements to the wiper devices, which wiper devices are positioned on the limbs to extend, at least during part of their wiping movements laterally from the limbs into the space bounded by them, whereby three sides of a vehicle positioned within the frame may be cleaned simultaneously by operating the suspension means to effect vertical movement of the carrier while the wiper devices have wiping movements imparted to them as aforesaid and are in wiping relation with the said sides of the vehicle, a sub-carrier adjacent the end limb and extending parallel thereto beyond that end of the frame, said sub-carrier being pivoted to the end limb, about an axis extending longitudinally thereof, for upward pivoting movement relative to the end limb, and carrying at least one downwardly-directed additional rotary wiper device for cleaning the roof of the vehicle, said additional rotary wiper device extending axially parallel to the length of the end limb, means for rotating said additional rotary wiper device, means for locking the sub-carrier to the end limb against the said pivoting movement, means for rendering said locking means inoperative when the carrier has been lowered to receive a vehicle between its side limbs, means for lifting the sub-carrier about its pivot to permit the carrier to receive between its side limbs the lower parts of the sides of the vehicle, and means for rendering said locking means operative again when the carrier has been subsequently raised.

References Cited in the file of this patent

UNITED STATES PATENTS

| | | |
|---|---|---|
| 1,718,151 | Jemmison | June 18, 1929 |
| 2,025,780 | Rosebrook | Dec. 31, 1935 |
| 2,063,062 | Sparklin | Dec. 8, 1936 |
| 2,583,703 | Morison | Jan. 29, 1952 |
| 2,610,342 | Griffiths | Sept. 16, 1952 |